Nov. 14, 1939.  A. C. RICHARDS  2,179,670
PISTON RING
Filed Sept. 6, 1938
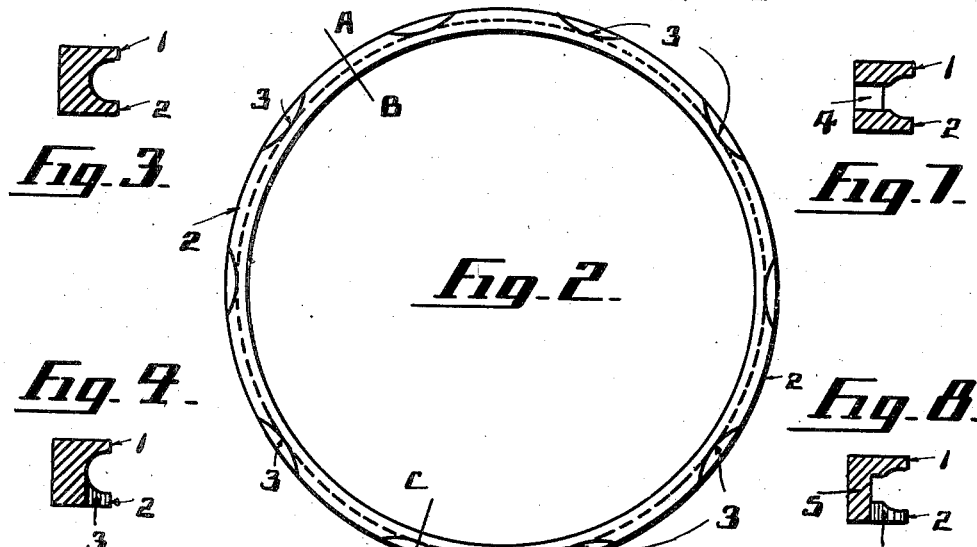
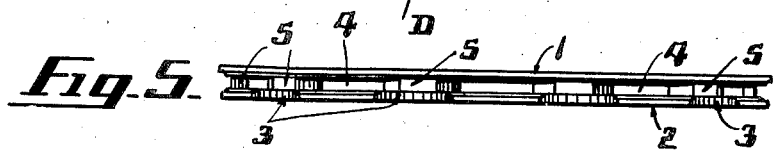
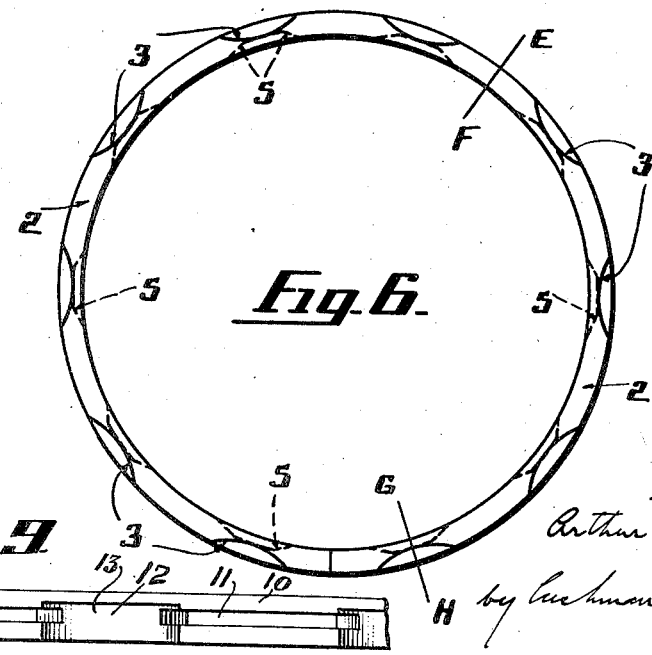
Inventor
Arthur C. Richards
by Cushman Darby & Cushman
attys.

Patented Nov. 14, 1939

2,179,670

UNITED STATES PATENT OFFICE 2,179,670

PISTON RING

Arthur Charles Richards, Leeds, England, assignor to Aero Piston Ring Company Limited, Leeds, England Application September 6, 1938, Serial No. 228,710
In Great Britain June 24, 1938

2 Claims. (Cl. 309—45)

This invention relates to piston rings of the grooved, slotted, or grooved and slotted types designed to control the amount of oil on the cylinder wall of an internal combustion engine, the chief object being to provide new or improved piston rings of these types which will have a greater efficiency and which will prevent over oiling.

According to the invention, the grooved, slotted or grooved and slotted piston ring has a plurality of oilways formed through its bottom land and communicating with or leading into the annular groove, or the slots, or the groove and slots in the ring.

The oilways, of which there may be any number, may be machined through the bottom land, and they may be cut in line with the solid portions of a slotted or grooved and slotted ring, or they may be cut in line with the slotted portion of a slotted or grooved and slotted ring.

In order that the invention may be clearly understood and readily carried into effect, the same will now be more fully described with reference to and by the aid of the embodiments illustrated in the accompanying drawing; wherein:

Figures 1 and 2 are respectively an inverted plan and a side elevation of a grooved piston ring having the invention applied thereto.

Figure 3 is a section taken on the line A. B. of Figure 2.

Figure 4 is a section taken on the line C. D. of Figure 2.

Figures 5 and 6 are similar views respectively to Figures 1 and 2, but illustrate the application of the invention to a grooved and slotted ring.

Figure 7 is a section taken on the line E. F. of Figure 6.

Figure 8 is a section taken on the line G. H. of Figure 6.

Figure 9 is a side view of further modified form of the invention.

Referring to Figures 1 to 4 of the drawing, the ring is grooved circumferentially on its outer face to afford upper and lower lands 1, 2 respectively for co-operation with the cylinder wall of an internal combustion engine, and the bottom land 2 has a plurality of oilways indicated at 3. These oilways which are equally spaced circumferentially are in the form of arcuate recesses machined out of the edge of the bottom land and extend to the depth of the annular groove between the lands.

In the embodiment illustrated in Figures 5 to 8, in which like reference numerals to those in Figures 1 to 4 indicate like or analogous parts, the ring in addition to being grooved to afford top and bottom lands 1, 2 is slotted through radially as indicated at 4 so as to leave only the circumferentially spaced solid portions 5 interconnecting the top and bottom lands 1, 2. The oilways 3 machined through the bottom land 2 in this construction are located in radial alignment with or opposite the solid portions 5 and are of such a length as to lead into the adjacent ends of the neighbouring slots. In this connection the ends of the slots cut through the grooved centreportion of the ring are inclined or diverge outwardly, as shown, so as to afford a lead to said slots.

As shown in Figure 9, the simple or plain ring 10 has the spaced circumferentially disposed slots 11 and the solid portions 12. The oil ways 13 are cut in the bottom land in the solid portions between the slots so as to communicate with the adjacent ends of neighboring slots.

The oilways provide for adequate lubrication and also form outlets for excess oil which may be collected in the slots and/or grooves, particularly when the piston is travelling in an upward direction or toward the cylinder head so that a suctional effect takes place to draw the oil from the slots and/or grooves by way of the oilways. Moreover, the invention enables the original pressure per square inch on the top land to be maintained at a maximum value by virtue of the fact that the provision of the oilways in the lower land allows the wear on the latter to be slightly in advance of that on the top land. Further, the balance of the grooved slotted, or grooved and slotted ring is retained since the edge of the bottom land is broken away or interrupted only at spaced points to afford the oilways.

I claim:

1. A piston ring having an outer circumferential groove forming top and bottom lands, said groove being formed with circumferentially disposed spaced slots and solid portions, and said bottom land adjacent the solid portions and between the slots being provided with oil-ways of sufficient width to extend into adjacent ends of neighboring slots, said slots coacting with the oil-ways to provide means to allow circulation of the oil to insure the removal of surplus oil from all parts of the ring.

2. A piston ring having a circumferentially disposed outer groove, said groove being provided with spaced radial slots and solid portions, and said bottom land adjacent the solid portions and between the slots being cut out to provide oilways communicating with the adjacent ends of neighboring slots, the ends of the slots adjacent the cut-away portions being inclined to provide a lead from the oil-ways to said slots, said slots coacting with the oil-ways to constitute means for allowing circulation of the oil to insure the removal of surplus oil from all parts of the ring.

ARTHUR CHARLES RICHARDS.